（12) United States Patent
Cho

(10) Patent No.: US 6,914,858 B2
(45) Date of Patent: Jul. 5, 2005

(54) OPTICAL PICKUP FOR HIGH DENSITY RECORDING/REPRODUCTION AND METHOD TO DETECT A REPRODUCTION SIGNAL

(75) Inventor: Kun-ho Cho, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 690 days.

(21) Appl. No.: 09/848,343

(22) Filed: May 4, 2001

(65) Prior Publication Data

US 2002/0006101 A1 Jan. 17, 2002

(30) Foreign Application Priority Data

Jun. 19, 2000 (KR) .............................. 10-2000-0033577

(51) Int. Cl.[7] .............................................. G11B 7/00
(52) U.S. Cl. .............................. 369/44.41; 369/124.12
(58) Field of Search .......................... 369/44.26, 44.41, 369/44.42, 124.12, 124.03, 124.01, 124.14, 44.37, 44.34, 112.01, 112.1, 47.1, 47.28, 47.18

(56) References Cited

U.S. PATENT DOCUMENTS 5,400,312 A * 3/1995 Haraguchi ............. 369/124.02
5,410,531 A * 4/1995 Tsujioka ................. 369/124.03
6,091,679 A * 7/2000 Kuribayashi et al. .... 369/44.27
6,442,114 B1 * 8/2002 Ishibashi et al. ......... 369/47.17

FOREIGN PATENT DOCUMENTS

| JP | 61-16053 | 1/1986 |
| JP | 63-231736 | 9/1988 |
| JP | 05-73919 | 3/1993 |

* cited by examiner

Primary Examiner—Nabil Hindi
(74) Attorney, Agent, or Firm—Stein, McEwen & Bui, LLP

(57) ABSTRACT

An optical pickup for high density recording and reproduction, and a reproduction signal detection method, which prevent degradation of a reproduction signal due to shot noise which occurs when a low optical power light is used to form a small light spot for high density reproduction. The optical pickup includes: a light source unit to emit a plurality of light beams, such that a plurality of light spots are formed on a same track of a recording medium; a photodetector to receive and photoelectrically convert the light beams incident through an objective lens and an optical path changer after having been reflected from the recording medium; and a reproduction signal detecting circuit to delay at least one of the detection signals output from the photodetector to remove time gaps between the detection signals, and to sum the delayed detection signal and the remaining detection signals, to detect a reproduction signal. As a result, the reproduction signal with a reduced noise component is detected.

18 Claims, 2 Drawing Sheets

OPTICAL PICKUP FOR HIGH DENSITY RECORDING/REPRODUCTION AND METHOD TO DETECT A REPRODUCTION SIGNAL

CROSS-REFERENCE TO RELATED APPLICATIONS

This application claims the benefit of Korean Application No. 2000-33577, filed Jun. 19, 2000, in the Korean Industrial Property Office, the disclosure of which is incorporated herein by reference.

BACKGROUND OF THE INVENTION

1. Field of the Invention

The present invention relates to an optical pickup for high density recording/reproduction, and a method to detect a reproduction signal, and more particularly, to an optical pickup for high density recording/reproduction, and a method to detect a reproduction signal, which are capable of preventing degradation of a reproduction signal caused by shot noise, which occurs when a low optical power light is used to form a small light spot for high density recording/reproduction.

2. Description of the Related Art

In general, for high density optical recording/reproduction, a light spot focused on a recording medium must be small. The diameter of the light spot, which has a Gaussian distribution, is larger than a track pitch, so a portion of the light spot focused on a main track extends into neighboring tracks.

Thus, if an intensity of the light spot is strong, an information signal can be recorded on and/or erased from the neighboring tracks, and a reproduction signal of the main track is adversely affected by the neighboring tracks. To avoid these problems, as a recording density increases, a light source with a lower optical power is needed.

FIG. 1 illustrates an example of a conventional optical pickup 100. As shown in FIG. 1, the conventional optical pickup 100 includes a light source 1, an objective lens 5 for focusing light emitted from the light source 1 to form a light spot on an information recording surface of an optical disc 10, a beam splitter 3 disposed on an optical path between the light source 1 and the objective lens 5, to change the traveling path of incident light, and a photodetector 7 to receive the light beam passed through the objective lens 5 after having been reflected by the optical disc 10, and directed toward the photodetector 7 by the beam splitter 3, to detect an information signal and/or an error signal.

The conventional optical pickup 100 forms a single light spot on a main track of the optical disc 10 to record the information signal on or to reproduce the information signal from the information recording surface of the optical disc 10. However, the conventional optical pickup 100 having the above configuration for high density recording and reproduction needs a low optical power light in reproducing information. The use of the low optical power light during reproduction causes shot noise, thereby sharply degrading the quality of a reproduction signal.

The reason that the quality of the reproduction signal degrades due to shot noise caused by the low optical power light is rooted in the quantal properties of light. In other words, it is probable that a photon is absorbed and photoelectrically converted by the photodetector 7, so that a signal output from the photodetector 7 always contains shot noise ripples. If the optical power of the light source 1 is high, a large number of photons are received by the photodetector 7, so that a high power signal is output from the photodetector 7. In this case, a shot noise level of the photodetector 7 is small relative to an amplitude of the output signal, and thus the problem of shot noise is not significant. In contrast, if the optical power of the light source 1 is low, the number of photons absorbed by the photodetector 7 decreases. As a result, a low power signal is detected by the photodetector 7 and the problem of shot noise is significant. For example, to increase recording density by four times, the size of the light spot must be reduced by one fourth, and the shot noise level increases by about three times. In other words, when a low optical power light is used for reproduction, the quality of the reproduction signal degrades due to a low signal-to-noise ratio.

SUMMARY OF THE INVENTION

Accordingly, it is an object of the present invention to provide an optical pickup for high density recording and reproduction, and a method to detect a reproduction signal, which prevent deterioration of the reproduction signal due to shot noise, which is caused when a low optical power light is utilized for high density reproduction.

Additional objects and advantages of the invention will be set forth in part in the description which follows, and, in part, will be obvious from the description, or may learned by practice of the invention.

The foregoing and other objects of the present invention are achieved by providing an optical pickup for high density recording and reproduction, comprising: a light source unit to emit a plurality of light beams, such that a plurality of light spots are formed on a same track of a recording medium; an objective lens to focus the light beams incident from the light source unit to form light spots on an information recording surface of the recording medium; an optical path changer disposed on an optical path between the light source unit and the objective lens, to alter a traveling path of the incident light beams; a photodetector to receive and photoelectrically convert the incident light beams through the objective lens and the optical path changer after having been reflected from the recording medium; and a reproduction signal detecting circuit to delay a detection signal output from the photodetector to remove time gaps between detection signals, and to sum the delayed detection signal and the other detection signals output from the photodetector, to detect a reproduction signal.

The light source unit includes a plurality of semiconductor laser devices, and a diffraction element to split the light beam emitted from the light source into the plurality of beams by diffraction, such that the plurality of light spots are formed on the same track of the recording medium.

The foregoing and other objects of the present invention may also be achieved by providing a reproduction signal detection method comprising: forming a plurality of light spots separated by a predetermined distance on a same track of a recording medium; separately receiving and photoelectrically converting light beams reflected from the recording medium, to output electrical signals; delaying at least one of the electrical signals to remove time gaps between the electrical signals; and summing the electrical signals from which the time gaps have been removed, to detect a reproduction signal from a same place of the recording medium.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 2:
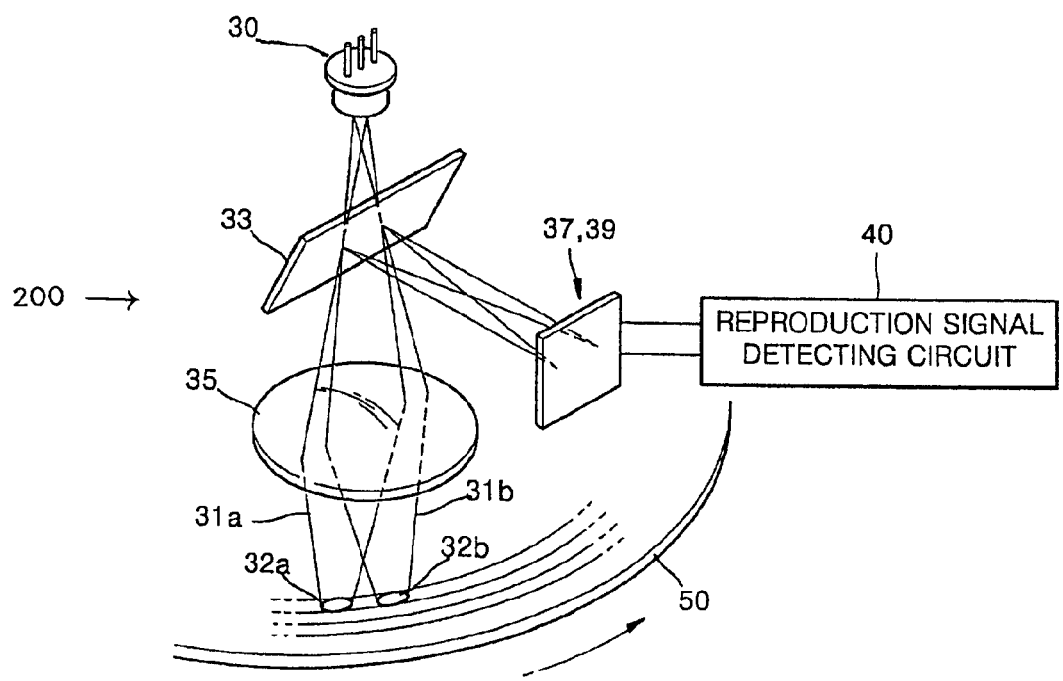
FIG. 2 is a perspective view illustrating an embodiment of an optical pickup for high density recording and reproduction according to the present invention.

Referring to FIG. 2, an optical pickup for high density recording and reproduction 200 according to an embodiment of the present invention includes a light source unit 30 to emit first and second light beams 31a and 31b; an objective lens 35 to focus the first and second light beams 31a and 31b incident from the light source unit 30 to form first and second light spots 32a and 32b on an information recording surface of a recording medium 50, for example, an optical disc; an optical path changer 33 placed on an optical path between the light source unit 30 and the objective lens 35, to change traveling paths of the first and second light beams 31a and 31b; first and second photodetectors 37 and 39 to receive the first and second light beams 31a and 31b, respectively, passed through the objective lens 35 after being reflected by the recording medium 50, and directed by the optical path changer 33 toward the first and second photodetectors 37 and 39, and to perform photoelectric conversion of the received first and second light beams 31a and 31b; and a reproduction signal detecting circuit 40 to detect a reproduction signal from electrical signals output from the first and second photodetectors 37 and 39.

Although, as shown in FIG. 2, a beam splitter to reflect and to transmit the incident light beam has been adopted as the optical path changer 33, any element capable of changing the traveling path of light, for example, a hologram optical element (HOE), or a combination of a polarization beam splitter or a polarization HOE and a wave plate can be adopted as the optical path changer 33.

The light source unit 30 emits the first and second light beams 31a and 31b, such that first and second light spots 32a and 32b are separated by a predetermined distance on a same track of the recording medium 50. In the present embodiment, the light source unit 30 may be comprised of two semiconductor laser devices. For example, the light source unit 30 may have a hybrid structure or a monolithic structure. The hybrid structure is manufactured by mounting two separate semiconductor laser devices on the same substrate, such that the semiconductor laser devices are electrically insulated from each other, and then by wire bonding each of the semiconductor laser devices. The monolithic structure is manufactured by combining two semiconductor laser devices through the same manufacturing process, and then by wire bonding each of the semiconductor laser devices. Alternately, the light source unit 30 can be constructed of two separate semiconductor laser devices. The semiconductor laser device may be either an edge emitting laser device or a vertical cavity surface emitting laser (VCSEL) device.

Figure 3:
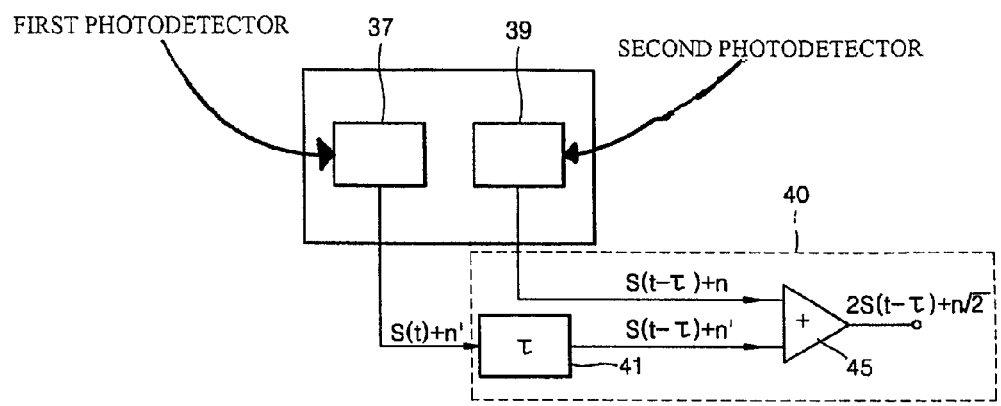
FIG. 3 is a schematic view illustrating the structures of the first and second photodetectors and the reproduction signal detecting circuit of the optical pickup shown in FIG. 2.

As shown in FIG. 3, the reproduction signal detecting circuit 40 includes a delay 41 to delay one of the electrical signals output from the first and second photodetectors 37 and 39, which precedes the other electrical signal, and an adder 45 to sum the signal delayed by the delay 41 and the other electrical signal, to thereby output a noise-free reproduction signal.

For example, given that the recording medium 50 rotates counterclockwise and the first light spot 32a is formed preceding the second light spot 32b, as shown in FIG. 2, the first photodetector 37 outputs an electrical signal $S(t)+n'$ by receiving the first beam 31a reflected from the recording medium 50. The output electrical signal $S(t)+n'$ precedes the electrical signal $S(t-\tau)+n$ output from the second photodetector 39, which receives the second beam 31b. The time gap $\tau$ between the signals $S(t)+n'$ and $S(t-\tau)+n$ is the quotient obtained by dividing the distance between the first and second light spots 32a and 32b by the linear velocity v of the recording medium 50. Here, the terms $s(t)$ and $S(t-\tau)$ indicate an information signal component reproduced from the recording medium 50, and n' and n indicate noise components including shot noise, which are included in the electrical signals output from the first and second photodetectors 37 and 39.

In this way, the delay 41 is connected to the output end of the first photodetector 37. The delay 41 delays the electrical signal $S(t)+n'$ from the first photodetector 37 by the time $\tau$, and outputs the delayed signal $S(t-\tau)+n'$. As a result, the adder 45 receives signals from a same place of a track, which have no time gap, and outputs a sum signal $2s(t-\tau)+n\sqrt{2}$ as a reproduction signal. In other words, as for the sum of the signals from the first and second photodetectors 37 and 39, the reproduction signal component becomes two times each reproduction component, i.e. $2s(t-\tau)$, and the noise component become $n\sqrt{2}$. Accordingly, the reproduction signal output from the adder 45 has an improved signal-to-noise ratio. Because there is no correlation between the noise components n and n', the root mean square (RMS) of each noise component is summed, so that the sum of the noise components n and n' becomes equal to $n\sqrt{2}$.

Although, in the present embodiment, the reproduction signal detecting circuit 40 is designed to be suitable for an inventive optical pickup which has been constructed to form the first and second light spots 32a and 32b on the recording medium 50 with the same intensity, the configuration of the reproduction signal detecting circuit 40 can be varied if the intensities of the first and second light spots 32a and 32b are not the same. For example, an amplifier (not shown) to correct the intensity difference may be installed at an output end of the first and second photodetectors 37 and 39.

In the detection of the reproduction signal having such a high signal-to-noise ratio, the optical pickup for high density recording and reproduction 200 operates as follows. First, the light source unit 30 emits the first and second light beams 31a and 31b whose optical power is low enough to perform high density reproduction. The first and second light beams 31a and 31b pass through the optical path changer 33, and are focused by the objective lens 35, such that the first and second light spots 32a and 32b are formed on the same track of the recording medium 50. After having been reflected from the recording medium 50, the first and second beams 31a and 31b pass through the objective lens 35 and the optical path changer 33, and then are received by the first and second photodetectors 37 and 39, respectively. Thus, the first and second photodetectors 37 and 39 can detect reproduction information signals from the same place of the recording medium 50, which are separated by a predetermined time gap.

One of the signals output from the first and second photodetectors 37 and 39, which precedes the other signal, is delayed in the delay 41 by the predetermined time τ to remove the time gap between the two signals output from the first and second photodetectors 37 and 39. Next, the delayed signal and the other signal, which have been read from the same place of the track without the time gap, are input to the adder 45, and the sum of the two signals is output from the adder 45 as a reproduction signal with a higher signal-to-noise ratio.

Although the optical pickup for high density recording and reproduction 200 described in the present embodiment adopts the light source unit 30 having low optical power for high density reproduction, information recorded on the same place of the recording medium 50 is detected with the time gap using at least two light spots 32a and 32b, which are focused a predetermined distance apart from each other. The time gap between the detected signals is removed and then summed, so that the reproduction signal having an enhanced signal-to-noise ratio can be detected.

Figure 1:
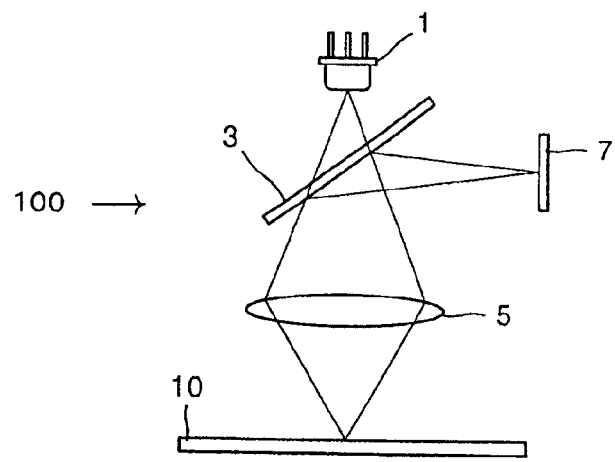
FIG. 1 is a schematic view showing a conventional optical pickup.

In particular, given that a single light spot is formed on the recording medium 50 by the conventional optical pickup 100 shown in FIG. 1, and each of the first and second light spots 32a and 32b focused on the recording medium 50 by the inventive optical pickup 200 have the same intensity, and the photodetector 7 of the conventional optical pickup and each of the first and second photodetectors 37 and 39 receives the same amount of light, the conventional optical pickup 100 detects a reproduction signal $S(t-\tau)+n$, whereas the inventive optical pickup 200 for high density recording and reproduction detects a reproduction signal $2S(t-\tau)+n\sqrt{2}$. In other words, the reproduction signal detected by the conventional optical pickup 100 has a signal-to-noise ratio of $S(t-\tau)/n$, whereas the reproduction signal detected by the inventive optical pickup 200 has a signal-to-noise ratio of $\sqrt{2}S(t-\tau)/n$.

Compared with the conventional optical pickup 100, the optical pickup for high density recording and reproduction 200 according to the present invention can reproduce an information signal with a √2 times higher signal-to-noise ratio at the same recording density, which is equivalent to increasing the optical power of a light source for reproduction.

Although the present embodiment of the optical pickup 200 has been described as it detects the reproduction signal by focusing just two light spots 32a and 32b the predetermined distance apart from each other on the same track of the recording medium 50, three or more light spots can be focused separated by a predetermined distance on the same track of the recording medium 50, and the reproduction signal can be detected using the three or more light spots, thereby further increasing the signal-to-noise ratio of the reproduction signal. In this way, the light source unit 30 is constructed such that it is able to emit three or more light beams to form the three or more light spots the predetermined distance apart from each other on the same track of the recording medium 50, and three or more photodetectors, corresponding to the number of the light beams emitted from the light source unit 30, are adopted. Furthermore, the reproduction signal detecting circuit 40 further includes one or more delays to eliminate time gaps between the signals output from the photodetectors. Then, the information signals read from the same place of the recording medium 50 are summed. For example, if the optical pickup 200 for high density recording and reproduction forms three light spots separated by a predetermined distance on the same track of the recording medium 50, the signal-to-noise ratio of the reproduction signal increases by √3 times, compared with the conventional optical pickup 100, which focuses a single light spot.

Figure 4:
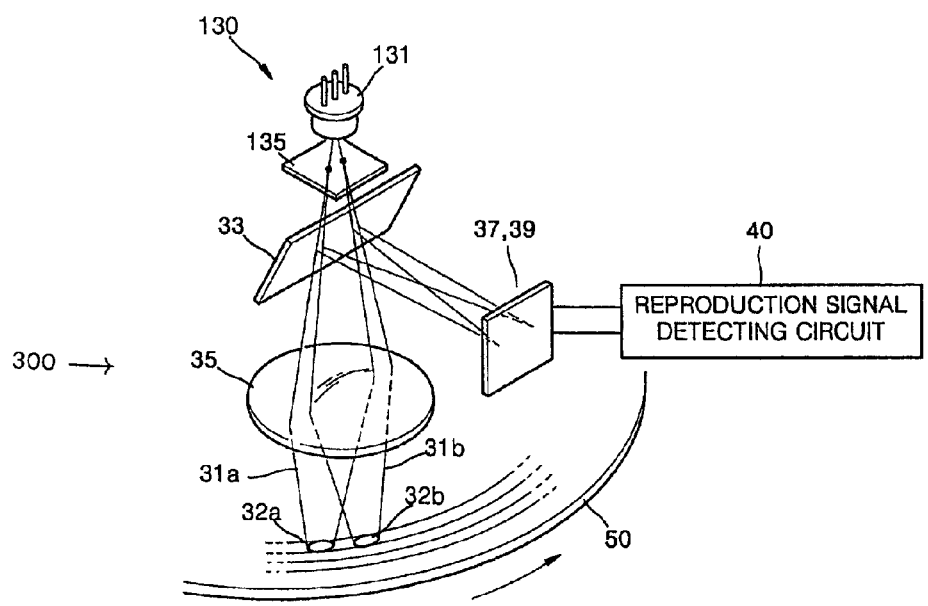
FIG. 4 is a perspective view illustrating another embodiment of an optical pickup for high density recording and reproduction according to the present invention.

FIG. 4 is a diagram illustrating another embodiment of an optical pickup 300 for high density recording and reproduction according to the present invention. The optical pickup 300 of FIG. 4 differs from the optical pickup 200 of FIG. 2 in that a light source 130 includes a single light source 131 and a diffraction element 135. In FIG. 4, the same elements as those of FIG. 2 are denoted with the same reference numerals, and descriptions of these elements are omitted.

The single light source 131 may be an edge emitting laser or a VCSEL. The diffraction element 135 may be a HOE. The diffraction element 135 splits a single light beam incident from the light source 130 into a plurality of light beams by diffraction, such that a plurality of light beams are focused on the same track of the recording medium 50 with a predetermined interval. For example, as shown in FIG. 4, the diffraction element 135 diffracts the incident beam into $0^{th}$-order and $+1^{st}$-order light, to thereby split the incident light beam into the first and second beams 31a and 31b.

The diffraction element 135 splits the incident light beam such that the split light beams have the same amount of light. If the intensity of the split light beams from the diffraction element 135 is not the same, at least one amplifier (not shown) with an appropriate gain factor can be installed in the reproduction signal detecting circuit 40.

The detection of the reproduction signal having a higher signal-to-noise ratio by the inventive optical pickup 300 shown in FIG. 4 is substantially the same as described with reference to FIGS. 2 and 3, and thus the operation of the optical pickup 300 of FIG. 4 will not be described here.

As previously described, the optical pickup for high density recording and reproduction according to the present invention can detect a reproduction signal with a higher signal-to-noise ratio, compared with a conventional optical pickup, by focusing a plurality of light spots 32a and 32b, separated by a predetermined distance on the same track of the recording medium 50, in which the light spots 32a and 32b are separately received by a plurality of photodetectors 37 and 39 after having been reflected from the recording medium 50, and the detection signals of the photodetectors 37 and 39 are summed after removal of the time gaps between the detection signals, so that the reproduction signal with a relatively reduced noise component is detected using a low optical power light for reproduction. In the present invention, the formation of a plurality of light spots 32a and 32b with low optical power is equivalent to increasing the optical power of an information reproduction light.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup for high density recording and reproduction, comprising:

a light source unit to emit a plurality of light beams, such that a plurality of light spots are formed on a same track of an information recording surface of a recording medium;

an objective lens to focus the light beams incident from the light source unit to form the light spots on the information recording surface of the recording medium;

an optical path changer disposed on an optical path between the light source unit and the objective lens, to alter a traveling path of the light beams reflected from the information recording surface incident from the objective lens;

a photodetector to receive and photoelectrically convert the light beams incident from the objective lens and the optical path changer after having been reflected from the recording medium, and to output detection signals; and a reproduction signal detecting circuit to delay one of the detection signals output from the photodetector to remove a time gap between the delayed detection signal and an undelayed one of the detection signals, and to sum the delayed detection signal and the undelayed detection signal, to detect a reproduction signal.

2. The optical pickup of claim 1, wherein the light source unit includes a plurality of semiconductor laser devices.

3. The optical pickup of claim 1, wherein the light source unit comprises:

a light source; and a diffraction element to split the light beams emitted from the light source into a plurality of diffracted light beams, such that the plurality of light spots are formed on the same track of the recording medium.

4. The optical pickup of claim 1, wherein the photodetector includes a plurality of photodetector portions to separately receive and photoelectrically convert the light beams reflected from the recording medium.

5. A reproduction signal detection method comprising:

forming a plurality of light spots separated by a predetermined distance on a same track of a recording medium using a respective plurality of light beams;

separately receiving and photoelectrically converting the light beams reflected from the recording medium, to output electrical signals;

delaying one of the electrical signals to remove a time gap between the electrical signals; and summing the delayed electrical signal with an undelayed one of the electrical signals, to detect a reproduction signal.

6. A pickup comprising:

a light source to emit a plurality of light beams, such that a plurality of light spots are formed on a recording medium, the light spots having a same displacement in a radial direction of the recording medium;

a detector to receive and photoelectrically convert the light beams reflected from the recording medium, and to output detection signals; and a signal detector to delay one of the detection signals output from the detector to remove a time gap between the delayed detection signal and an undelayed one of the detection signals.

7. The pickup of claim 6, wherein the signal detector sums the delayed detection signal and the undelayed detection signal, to detect a reproduction signal.

8. A pickup comprising:

a light source to emit a plurality of light beams, such that a plurality of light spots are formed on a recording medium;

a detector to receive and photoelectrically convert the light beams reflected from the recording medium, and to output detection signals; and a signal detector to delay one of the detection signals output from the detector to remove a time gap between the delayed detection signal and an undelayed one of the detection signals, wherein the signal detector sums the delayed detection signal and the undelayed detection signal, to detect a reproduction signal, and the light spots are formed a predetermined distance from each other on a same track of an information recording surface of the recording medium.

9. The pickup of claim 8, further comprising:

a lens to focus light beams incident from the light source to form the light spots; and an optical path changer disposed on an optical path between the light source and the lens, to alter a path of light beams incident from the objective lens.

10. The pickup of claim 9, wherein the optical path changer is a beam splitter or a hologram optical element (HOE).

11. The pickup of claim 10, wherein the reproduction signal equals $2S(t-\tau)+n\sqrt{2}$, wherein t equals time, $\tau$ equals a time delay of the delayed detection signal, $2S(t-r)$ is an information signal component of the reproduction signal, n is a noise component of the undelayed detection signal, and $n\sqrt{2}$ is a noise component of the reproduction signal.

12. The pickup of claim 11, wherein a signal-to-noise ratio of the reproduction signal is $\sqrt{2}S(t-\tau)/n$.

13. The pickup of claim 7, further comprising a diffraction element to split the light beams emitted from the light source.

14. The optical pickup of claim 1, wherein three light spots are formed and the reproduction signal detecting circuit delays the third light spot output from the photodetector as another delayed detection signal to remove time gaps between the another delayed detection signal, the delayed detection signal and the undelayed detection signal, to detect the reproduction signal.

15. The pickup of claim 6, wherein three or more light spots are formed and the signal detector delays the third light spot output from the photodetector as other delayed detection signals to remove time gaps between the other delayed detection signals, the delayed detection signal.

16. A pickup comprising:

a light source to emit a plurality of light beams, such that a plurality of light spots are formed on a recording medium;

a detector to receive and photoelectrically convert the light beams reflected from the recording medium, and to output detection signals; and a signal detector to delay one of the detection signals output from the detector to remove a time gap between the delayed detection signal and an undelayed one of the detection signals, wherein the signal detector sums the delayed detection signal and the undelayed detection signal, to detect a reproduction signal, wherein the signal detector comprises:

a delay unit to delay the delayed detection signal; and an adder to sum the delayed detection signal and the undelayed detection signal.

17. The pickup of claim 16, further comprising an amplifier installed to an output end of the detector to correct an intensity difference between the light spots.

18. The pickup of claim 13, wherein the diffraction element splits the light beams into split light beams having a same amount of light.

* * * * *

UNITED STATES PATENT AND TRADEMARK OFFICE
CERTIFICATE OF CORRECTION

PATENT NO. : 6,914,858 B2
DATED : July 5, 2005
INVENTOR(S) : Kun-ho Cho

It is certified that error appears in the above-identified patent and that said Letters Patent is hereby corrected as shown below:

<u>Column 8,</u>
Line 20, change "r" to -- $\tau$ --.

Signed and Sealed this

Thirteenth Day of September, 2005

JON W. DUDAS
*Director of the United States Patent and Trademark Office*